Oct. 12, 1926.                                          1,602,882
L. W. CHUBB
MEASURING INSTRUMENT
Filed Sept. 23, 1922
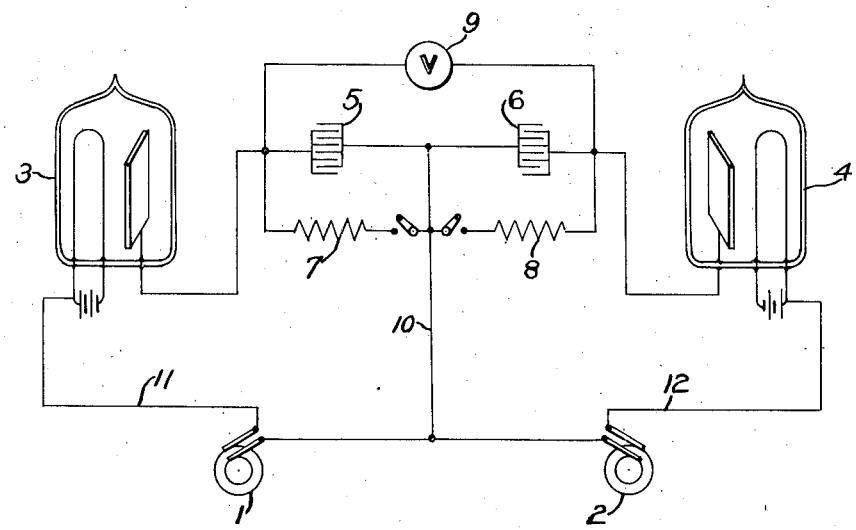
WITNESSES:
INVENTOR
Lewis Warrington Chubb.
BY
ATTORNEY Patented Oct. 12, 1926.

1,602,882

UNITED STATES PATENT OFFICE.

LEWIS W. CHUBB, OF EDGEWOOD, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

Application filed September 23, 1922. Serial No. 590,166.

My invention relates to alternating-current systems and devices and particularly to methods of, and means for, measuring or utilizing the differential effects between alternating-current circuits fed from different sources.

One object of my invention is to provide a method of, and means for, measuring or utilizing a differential effect between alternating-current circuits fed from different sources.

Another object of my invention is to provide a simple and expeditious means for determining the difference between the peak-voltage values of two alternating-current circuits, irrespective of the frequencies or phase relations thereof.

In practicing my invention, I provide a method of, and means for, determining or utilizing the difference between the peak voltages of different alternating-current circuits, in which the voltages are converted into direct or continuous voltages and so combined as to permit the determination or utilization of a resultant voltage.

The single figure of the accompanying drawing is a diagrammatic view of a device or system embodying my invention, showing a preferred means for practicing the same.

The means, illustrated, for carrying my invention into effect comprises, in general, two sources 1 and 2 of alternating-current supply, hot-cathode converters 3 and 4, condensers 5 and 6, resistors 7 and 8 and a translating device or voltmeter 9.

The alternating-current sources 1 and 2 are connected to a three-conductor circuit comprising an intermediate conductor 10 and outside conductors 11 and 12. The hot-cathode converter 3 is connected, in series relation with the condenser 5, between the conductors 10 and 11 and, similarly, the converter 4 is connected, in series relation with the condenser 6, between the conductors 10 and 12. The resistors 7 and 8 are connected in shunt relation to the condensers 5 and 6, respectively. The voltmeter 9, or other means responsive to the difference between charges in the condensers 5 and 6, is connected across the condensers 5 and 6.

In operation, alternating currents from the sources 1 and 2 are converted or transformed into direct currents by the hot-cathode converters 3 and 4. The direct currents are impressed on the condensers 5 and 6 which will, consequently, be charged in accordance with the peak-voltage values of the sources 1 and 2, respectively. Thus, the voltmeter 9 will be actuated in accordance with the difference between the peak-voltage values of the sources 1 and 2. The resistors 7 and 8 are provided to slowly discharge the condensers 5 and 6 when the voltage of the sources 1 and 2 is reduced.

By my invention, a simple and effective means is obtained for measuring the differences of peak-voltage values of two alternating-current sources, which is independent of the frequency or phase relation of the sources.

While I have shown and described a preferred form of my invention, it is to be understood that various changes and modifications may be made therein without departing from the spirit and scope thereof and I desire, therefore, that only such limitations be placed thereon as are indicated by the appended claims.

I claim as my invention:

1. In an alternating-current measuring device, the combination with a plurality of alternating-current circuits, of means automatically responsive to differences in the peak-voltage values thereof for giving direct indications of said differences.

2. In an alternating-current measuring device, the combination with a plurality of alternating-current circuits, of means for converting voltages from the circuits into direct voltages, and means automatically actuated by said direct voltages directly in accordance with differences in peak values thereof.

3. In an alternating-current measuring device, the combination with a plurality of alternating-current circuits, of means for converting voltages from the circuits into direct voltages, translating means subject to said direct voltages, and means automatically actuated by said translating means directly in accordance with differences in peak values of said direct voltages.

4. In an alternating-current measuring device, the combination with a plurality of alternating-current circuits, of means for converting voltages from the circuits into direct voltages, storage means subject to said direct voltages, and means automatically actuated by said storage means directly in accordance with differences in peak values of said direct voltages.

5. The combination with a plurality of alternating-current circuits, of means for converting current from the circuits into direct current, condensers subject to said direct currents and means responsive to differences in the voltage charges in said condensers.

6. In an alternating-current measuring device, the combination with a plurality of alternating-current circuits, of means for measuring differences in the peak-voltage values thereof, including means for converting current from the circuits into direct currents, condensers subject to said direct currents and means responsive to voltage charges in said condensers.

7. In an alternating-current measuring device, the combination with a plurality of alternating-current circuits, of means for measuring differences in the peak-voltage values thereof, including means for converting current from the circuits into direct currents, condensers subject to said direct currents and means responsive to differences in the voltage charges in said condensers.

8. In an alternating-current measuring device, the combination with a plurality of alternating-current circuits, of means for measuring differences in the peak-voltage values thereof including means for converting currents from the circuits into direct currents, condensers subject to said direct currents, and means for slowly discharging said condensers.

9. In an alternating-current measuring device, the combination with a plurality of alternating-current circuits, of means for measuring differences in the peak-voltage values thereof, including means for converting currents from the circuits into direct currents, indicating means, condensers subject to said direct currents, and means for slowly discharging said condensers.

10. In an alternating-current measuring device, the combination with a three-conductor alternating-current circuit, of a source of alternating-current on each side of the intermediate of said conductors connected between said conductor and the adjacent outside conductor, a condenser and means for converting alternating current into direct current connected in series between each outside conductor and the intermediate conductor, and means connected in shunt to said condensers.

11. In an alternating-current measuring device, the combination with a three-conductor alternating-current circuit, of a source of alternating current on each side of the intermediate of said conductors connected between said conductor and the adjacent outside conductor, a condenser and means for converting alternating current into direct current connected in series between each outside conductor and the intermediate conductor, and means connected in shunt to each condenser.

12. In an alternating-current measuring device, the combination with a three-conductor alternating-current circuit, of a source of alternating current on each side of the intermediate of said conductors connected between said conductor and the adjacent outside conductor, a condenser and means for converting alternating current into direct current connected in series between each outside conductor and the intermediate conductor, and indicating means connected in shunt to said condensers.

13. In an alternating-current measuring device, the combination with a three-conductor alternating-current circuit, of a source of alternating current on each side of the intermediate of said conductors connected between said conductor and the adjacent outside conductor, a condenser and means for converting alternating current into direct current connected in series between each outside conductor and the intermediate conductor, indicating means connected in shunt to said condensers, and a resistor connected in shunt to each condenser.

14. In an alternating-current measuring device, the combination with a three-conductor alternating-current circuit, of a source of alternating current on each side of the intermediate of said conductors connected between said conductor and the adjacent outside conductor, a condenser and a hot-cathode converter connected in series between each outside conductor and the intermediate conductor, a resistor connected in shunt to each condenser, and a voltmeter connected in shunt to both condensers.

In testimony whereof, I have hereunto subscribed my name this 16th day of September, 1922.

LEWIS W. CHUBB.